Patented Aug. 5, 1952

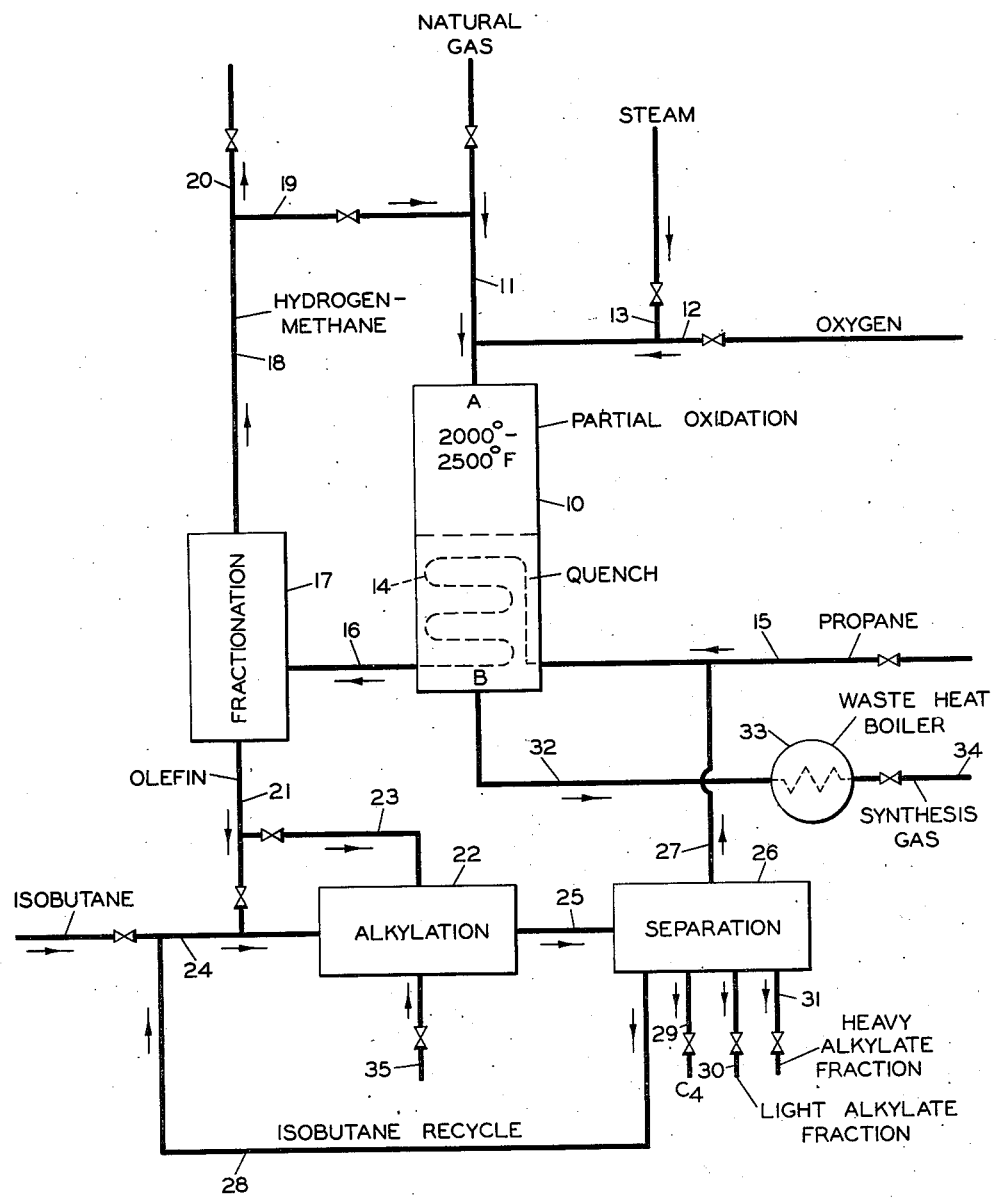

2,606,158

UNITED STATES PATENT OFFICE 2,606,158

SYNTHESIS GAS MANUFACTURE

S Grant Stewart, Bartlesville, Okla., assignor to Phillips Petroleum Company, a corporation of Delaware Application January 4, 1949, Serial No. 69,177

6 Claims. (Cl. 252—373)

This invention relates to a process for the manufacture of carbon monoxide and hydrogen synthesis gas. In one of its more specific aspects it relates to a process for the manufacture of synthesis gas by the partial oxidation of natural gas or methane and of heavier paraffin hydrocarbons. In a preferred embodiment this invention relates to the manufacture of synthesis gas of a hydrogen to carbon monoxide mol ratio in the range of 1.7:1 to 2.3:1, and to the prevention of excessive carbon and carbon dioxide formation.

In processes such as the manufacture of hydrocarbons by the Fischer-Tropsch method or the manufacture of oxygen-containing compounds such as alcohols from carbon monoxide and hydrogen, it is usually desirable to use as a charge material, synthesis gas in a mol ratio of hydrogen to carbon monoxide of about 1.7:1 to 2.3:1. When such a ratio is not used, undesirable side reactions take place and product yields are undesirably reduced. Such a synthesis gas as may be most advantageously used in these processes is not, however, always readily available because of the presence of paraffin hydrocarbons heavier than methane in the feed to a synthesis gas manufacturing process.

One common method for the preparation of carbon monoxide and hydrogen synthesis gas is by the partial oxidation of natural gas or methane. The partial oxidation of pure methane will give the highest mol ratio of hydrogen to carbon monoxide; because heavier hydrocarbons, some of which are present in natural gas, have a lower hydrogen to carbon mol ratio, thus causing a concomitant lower ratio of hydrogen to carbon monoxide in the synthesis gas made therefrom. Because of the lower mol ratio of hydrogen to carbon in hydrocarbons heavier than methane, such as ethane, propane, butane, and heavier, it has been the practice to maintain their volume at a minimum in the charge stocks to partial oxidation reactions for the preparation of synthesis gas. A further reason for maintaining only small quantities of hydrocarbons heavier than methane in such charge stocks is because of their tendency to form carbon during the partial oxidation reaction thus cutting down operating efficiency.

An object of this invention is to provide a process for the manufacture of carbon monoxide and hydrogen synthesis gas.

Another object of this invention is to manufacture synthesis gas in the desired mol ratios of hydrogen to carbon monoxide by an economical and novel process.

Another object of this invention is to provide a process for the manufacture of carbon monoxide and hydrogen synthesis gas wherein deposition of carbon and formation of excessive carbon dioxide are materially inhibited.

Another object of this invention is to manufacture hydrogen and carbon monoxide synthesis gas in a ratio in the range of 1.7:1 to 2.3:1 from methane or methane-containing gases such as natural gas which also contains up to 20 to 40 mol per cent of $C_2$ and heavier paraffin hydrocarbons.

Further objects and advantages of this invention will be apparent to one skilled in the art from the accompanying disclosure and discussion.

I have discovered a process whereby synthesis gas of an optimum mol ratio of hydrogen to carbon monoxide may be produced by the partial oxidation of methane or a methane-containing gas such as natural gas containing as much as 20 to 40 mol per cent of $C_2$ and heavier paraffin hydrocarbons. I have also discovered that such a synthesis gas may be made when hydrogen is present along with the $C_2$ and heavier paraffin hydrocarbons.

In accordance with my invention a gaseous hydrocarbon material such as natural gas or methane, containing as much as 20 to 40 mol per cent of $C_2$ and heavier paraffin hydrocarbons may be partially oxidized by an exothermic reaction with oxygen or an oxygen-containing gas such as air at an elevated temperature in the range of 2000 to 2500° F. to produce carbon monoxide and hydrogen synthesis gas. Generally it is preferred to use those hydrocarbons heavier than methane which fall in the range of $C_2$ to $C_4$ in the charge stock. The heavier the hydrocarbon the lower is its hydrogen to carbon ratio, and therefore the greater the quantity of hydrogen required to bring the ratio of hydrogen to carbon monoxide in the synthesis gas to within the range of 1.7:1 to 2.3:1. Since it is desirable to maintain the partial oxidation step on an exothermic basis, only a limited amount of steam may be added to raise the hydrogen to carbon monoxide mol ratio. The following equation shows how the amount of hydrogen may be increased by the use of steam, however, since this reaction is endothermic, it may not be utilized fully. Therefore, the difference between the desired quantity of hydrogen and the hydrogen produced is made up according to my process by utilizing hydrogen produced in the cracking step hereinafter discussed. In one embodiment of my invention it is not necessary to use steam at all to increase the quantity of hydrogen since the deficiency may be made up completely from that produced in the cracking step.

(1) $\quad C_2H_6 + 2H_2O \rightarrow 2CO + 5H_2$

The product of the exothermic partial oxidation reaction which comprises carbon monoxide, hydrogen, steam, carbon dioxide, and some unreacted hydrocarbon, is rapidly quenched by contacting a cracking stock such as, for example, propane, a propane-rich stock, or paraffin hydrocarbons in the range of $C_2$ to $C_4$ in indirect heat exchange and thereby causing thermal cracking of said cracking stock and rapid quenching of the product gases to a temperature in the range of 1200 to 1600° F. Heavier cracking stocks may be used, however, because they may generally be cracked at temperatures lower than those required for $C_2$ to $C_4$ paraffins; the contact time must be very short. It is also more desirable to use the $C_2$ to $C_4$ cracking stocks because the heavier hydrocarbons deposit a good bit of coke or carbon when cracked at temperatures prevailing in the quenching step of my invention. Such quenching may be accomplished by passing the cracking stock through a system of heat exchange tubes in the same reaction chamber and adjacent to the partial oxidation zone so that uniform contacting with the product synthesis gas is obtained. Following the quenching step wherein the temperature of the partial oxidation product is substantially reduced, the product is further cooled by ordinary heat exchange means such as waste heat boilers and the like to efficiently utilize the remaining exothermic heat of oxidation and to rapidly cool the product material to a temperature below 900° F. By such rapid quenching and cooling I am able to reduce the temperature of the partial oxidation products below the temperature at which the water gas shift shown below in Equation 2 is effective, thus reducing substantially the amount of carbon dioxide present in the synthesis gas.

(2) $\quad CO + H_2O \rightleftharpoons CO_2 + H_2$

By controlling the water gas shift reaction in this way by rapidly quenching the partial oxidation products through the temperature range at which it takes place, valuable carbon monoxide is kept from reacting with steam to form carbon dioxide and hydrogen. The hydrogen to carbon monoxide mol ratio is less than that obtained by letting the water gas shift take place, however, this may be circumvented by the addition of hydrogen from the cracking step. Direct quenching of the synthesis gas with $C_2$–$C_4$ paraffins may also be used, but is less preferred, since the individual reaction conditions are more difficult to control in such an operation.

The product from the thermal cracking which contains hydrogen, methane, ethylene and other hydrocarbons, depending on the particular charge stock, is separated in such a manner that an overhead fraction containing hydrogen and methane is recovered. At least a portion of this hydrogen-methane fraction may be introduced to the partial oxidation reaction along with the other charge stock. By so operating I have found that the amount of carbon deposition is reduced, possibly because the hydrogen thus added to some extent inhibits the carbon deposition due to cracking of the heavier hydrocarbons.

Further, the introduction of the hydrogen builds up the mol ratio of hydrogen to carbon monoxide to the desired value which is preferably in the range of 1.7:1 to 2.3:1. The quantities of hydrogen necessary will vary with the charge stock used in the partial oxidation and their determination is well within the skill of the art. It is within the scope of my invention, and in some cases, depending on the charge stock to the partial oxidation process, it may be desirable, to separate the hydrogen from the hydrogen-methane fraction to be introduced to the synthesis gas reaction zone and introduce it instead to the cooled product synthesis gas.

By adjusting the mol ratio of oxygen to the hydrocarbon material which is partially oxidized according to my process to maintain an oxidizing atmosphere in the partial oxidation step, one is able to further reduce the formation of elemental carbon. For example, when natural gas is the source of the hydrocarbon to be oxidized, a desirable mol ratio of oxygen to hydrocarbon to maintain an oxidizing atmosphere has been found to be from 0.7:1 to 0.9:1. Obviously, this will vary, depending on the hydrocarbon oxidized, however, one skilled in the art may readily determine such ratios.

The heavier product from the thermal cracking step which will generally contain considerable quantities of olefins, i. e., the $C_2$ and heavier product, may be used for such processes as alkylation or polymerization where it is reacted to form still heavier hydrocarbons. Any of the many alkylation processes may be used such as boron trifluoride, aluminum chloride, sulfuric acid, hydrofluoric acid, and thermal alkylation. Such a process provides for the formation of hydrocarbons, such as for example those which are suitable for use in gasoline, by the reaction of an isoparaffin with an olefin. The particular alkylation process used will often depend on the materials to be treated and therefore my invention is not to be limited by the selection of one particular process.

When the $C_2$ and heavier product from the thermal cracking step of my invention is used as part of the feed to a catalytic alkylation process, it is first desirable to remove the acetylene which will deactivate the catalyst quite rapidly. It is also desirable to remove it as a valuable by-product of the process. Any suitable method for selectively removing acetylene known to those skilled in the art may be employed, such as, selective catalytic oxidation; selective solvent extraction using high pressure water, acetic acid, or ammoniacal cuprous or silver salts; or selective catalytic hydrogenation. It is also desirable to remove diolefins, such as butadiene, from the alkylation feed.

The cracked hydrocarbon product containing olefins from which a hydrogen-methane fraction has been removed, and from which may also be removed an acetylene fraction when desired, is passed to an alkylation process along with an isoparaffin such as isobutane. At present it is usually not desirable to use isoparaffins heavier than isobutane as charge to an alkylation process because they are more valuable as motor fuel constituents, however, it is within the scope of my invention to use such hydrocarbons. Any paraffin or other hydrocarbons present in the cracking product may be passed through the alkylation process where some of them may alkylate to some extent or they may be removed before alkylation by conventional means such as fractional distillation or by solvent extraction.

If it is desired to polymerize the product from the cracking step of my invention, any of the conventional thermal or catalytic processes may be employed. One advantage of using a polymerization process to treat the cracked materials is that no other material need be utilized along with the olefins to produce heavier hydrocarbons, as is the case when employing alkylation. Suitable catalysts for use in catalytic polymerization of the cracked materials have been found to be solid phosphoric acid, sulfuric acid, promoted metal oxides, and the like.

The product from either alkylation or polymerization of the thermally cracked materials is separated and used as desired. Usually it is most economical to separate the $C_2$ to $C_4$ paraffins from such products for recycle to the cracking step, and then separating the remaining materials as desired, such as in the case of alkylation, into gasoline range hydrocarbons, and heavier alkylate. The polymerization products may be similarly separated as the economics of the process demand. It is also within the scope of the invention to isolate individual olefins from the cracking product and use them individually to alkylate isoparaffins in separate alkylation zones under optimum conditions for each olefin.

A more clear understanding of some of the many aspects of my invention may be had by referring to the attached drawing, which is a schematic flow diagram, in conjunction with the following discussion. Various valves and other conventional equipment necessary for the practice of this invention will be familiar to one skilled in the art and have been omitted from the drawing for the sake of clarity. The disclosure provides one method for operating my process, however, while this is representative in general of my process, various minor changes may be made in adapting the process to the various conditions within the scope of the invention.

Refer now to the drawing. Natural gas is introduced to partial oxidation zone A of reaction chamber 10 by line 11 along with oxygen introduced through lines 12 and 11 and/or steam and carbon dioxide introduced through lines 13, 12, and 11. These materials are burned together at a temperature in the range of 2000 to 2500° F. and for a period of time in the range of 0.02 to 2 seconds, but preferably in the range of 0.1 to 1.5 seconds in such a manner that a partial oxidation of the hydrocarbon takes place thus producing carbon monoxide and hydrogen as the principal constituents of the effluent material. The effluent from zone A of chamber 10 is passed to zone B where it contacts heat exchange tubes 14 through which is passed a propane cracking stock introduced through line 15. By so contacting the heat exchange tubes the cracking stock is heated to an elevated temperature at which it is thermally cracked or dehydrogenated, and the partial oxidation products are quenched by removal of exothermic heat used in said cracking. The cracked material from coils 14 is passed via line 16 to a separation zone 17, such as a fractional distillation column, flash chamber, or charcoal adsorption unit, wherein a hydrogen-methane fraction is separated from a $C_2$ and heavier fraction. The hydrogen-methane fraction is removed via line 18 and may be passed via lines 19 and 11 back to the partial oxidation zone. However, it is within the scope of my invention that only portions of this light fraction may be passed to the partial oxidation zone or none at all, depending on the feed stock to zone A. This is necessary because of the varying ratio of hydrogen to carbon monoxide which may be obtained depending upon the particular charge stock used. For example, in one case a synthesis gas may be obtained having a ratio of hydrogen to carbon monoxide of 1.5 to 1 and thus it would be desirable to introduce a quantity of hydrogen to increase this ratio to at least 1.7 to 1. Likewise, a product may contain hydrogen to carbon monoxide in a ratio of only 1.3 to 1 and a greater quantity of hydrogen will be necessary to raise the hydrogen content of this mixture to that of at least 1.7 to 1 than would be necessary in the previous example. Therefore, it is obvious that under different circumstances it will be desirable to add different quantities of hydrogen. Therefore, it may be necessary to send a portion or all of the hydrogen-methane fraction separated in zone 17 to storage means or to other use via line 20.

The $C_2$ and heavier fraction from the cracking step, containing appreciable quantities of olefins, which is removed from zone 17 via line 21 is passed to alkylation zone 22 via line 23 or line 24. In one case, that of introducing this fraction through line 23 to the alkylation zone, the fraction contacts the material to be alkylated within zone 22, and in the other case it is admixed with the material to be alkylated such as isobutane prior to introduction to the alkylation zone. The above mentioned alkylation may advantageously take place in the presence of a catalyst such as aluminum chloride or other well-known alkylation catalysts as have been previously discussed. The total effluent from alkylation zone 22 is passed via line 25 to separation zone 26 where it is separated into desired fractions. A $C_2$–$C_3$ paraffin fraction may be removed from zone 26 via line 27 and passed to line 15 where it is admixed with the propane cracking stock which is introduced to coils 14 via line 15. By thus recycling propane, the cracking stock is reacted to extinction. Unreacted isobutane is also separated in zone 26 and passed via lines 28 and 24 to alkylation zone 22. A $C_4$ fraction is removed from zone 26 via line 29. Light alkylate and heavier alkylate fractions are removed from this same zone via line 30 and 31 respectively.

The quenched partial oxidation products are removed from zone B of chamber 10 via line 32 and are utilized for heating steam and the like in waste heat boiler 33. Cooled synthesis gas in an average ratio of hydrogen to carbon monoxide of about 2 to 1 is recovered via line 34 for use in such processes as Fischer-Tropsch synthesis and methanol synthesis.

Thus it may be seen that advantages of my process are the production of a synthesis gas which may contain hydrogen and carbon monoxide in a mol ratio above that obtained by the usual partial oxidation reaction; economical utilization of heat of oxidation; rapid quenching of partial oxidation products to substantially reduce the formation of carbon dioxide by the water gas shift reaction; and the formation of alkylate or other hydrocarbon fractions suitable for use in gasolines, solvents, and the like.

Although this process has been described and exemplified in terms of its preferred modifications, it is understood that various changes may be made without departing from the spirit and scope of the disclosure and of the claims.

I claim:

1. A process for the manufacture of hydrogen and carbon monoxide synthesis gas, which comprises subjecting a $C_1$ to $C_4$ paraffin hydrocarbon to partial oxidation in the presence of an oxygen containing gas at a temperature in the range of 2000 to 2500° F. and for a period of time in the range of 0.02 to 2 seconds, rapidly quenching the product of said partial oxidation by indirect heat exchange with a cracking stock and thus rapidly cooling said product to a temperature in the range of 1200 to 1600° F. and thermally cracking said cracking stock, rapidly cooling the quenched partial oxidation product to a temperature below about 900° F. to prevent the formation of excessive carbon dioxide, separating the product of said thermal cracking and recovering a hydrogen and methane fraction therefrom, a portion of which is passed to the partial oxidation reaction, and recovering hydrogen and carbon monoxide from said partial oxidation in an optimum ratio in the range of 1.7:1 to 2.3:1.

2. A process for the manufacture of hydrogen and carbon monoxide synthesis gas in a ratio in the range of 1.7:1 to 2.3:1, which comprises partially oxidizing a methane-containing gas which contains not more than 20 to 40 mol per cent $C_2$ and heavier paraffin hydrocarbons in the presence of an oxygen-containing gas at a temperature in the range of 2000 to 2500° F. and for a period of 0.1 to 1.5 seconds, rapidly quenching the product of said partial oxidation by indirect heat exchange with a $C_2$ to $C_4$ paraffin cracking stock and thus reducing the temperature of said partial oxidation product to within the range of 1200 to 1600° F. and thereby supplying heat for cracking said paraffin, cooling the quenched partial oxidation product to a temperature below about 900° F. to prevent the formation of excessive carbon dioxide by the water gas shift reaction, and recovering the synthesis gas product of said partial oxidation as a product of the process; separating the product of said thermal cracking and recovering a hydrogen and methane fraction therefrom, and passing a sufficient quantity of the hydrogen and methane fraction to said partial oxidation to raise the hydrogen content of the product synthesis gas so that a ratio of hydrogen to carbon monoxide in the range of 1.7:1 to 2.3:1 is obtained.

3. A process according to claim 2 wherein the oxygen-containing gas is oxygen.

4. A process according to claim 2 wherein the oxygen-containing gas is air.

5. A process according to claim 2 wherein the methane-containing gas is natural gas.

6. A process for the manufacture of hydrogen and carbon monoxide synthesis gas, which comprises subjecting natural gas which contains not more than 20 to 40 mol per cent $C_2$ to $C_4$ paraffin hydrocarbons to partial oxidation in the presence of an oxygen-containing gas at a temperature in the range of 2000 to 2500° F. and for a period of time in the range of 0.1 to 1.5 seconds, rapidly quenching the product of said partial oxidation by indirect heat exchange with a propane cracking stock and thus rapidly cooling said product to a temperature in the range of 1200 to 1600° F. and thermally cracking said propane cracking stock, rapidly cooling said quenched partial oxidation product to a temperature below about 900° F. to prevent the formation of carbon dioxide by the water gas shift reaction, separating the product of said cracking and recovering a hydrogen and methane fraction therefrom, and passing a sufficient quantity of said hydrogen-methane fraction to said partial oxidation to bring the ratio of hydrogen to carbon monoxide in the product in the range of 1.7:1 to 2.3:1 and recovering this synthesis gas as a product of the process.

S. GRANT STEWART.

REFERENCES CITED

The following references are of record in the file of this patent:

UNITED STATES PATENTS

| Number | Name | Date |
|---|---|---|
| 1,843,063 | Burke | Jan. 26, 1932 |
| 1,983,992 | Pyzel | Dec. 11, 1934 |
| 2,051,363 | Beekley | Aug. 18, 1936 |
| 2,401,933 | Hersberger | June 11, 1946 |
| 2,445,824 | Frey et al. | July 27, 1948 |
| 2,486,879 | Rees et al. | Nov. 1, 1949 |